United States Patent [19]
Klotz et al.

[11] Patent Number: 5,511,642
[45] Date of Patent: Apr. 30, 1996

[54] OVERRUNNING CLUTCH ASSEMBLY

[75] Inventors: James R. Klotz, Mt. Clemens; Berthold Martin, Shelby Township, both of Mich.

[73] Assignee: Chrysler Corporation, Auburn Hills, Mich.

[21] Appl. No.: 225,671

[22] Filed: Apr. 11, 1994

[51] Int. Cl.$^6$ ............ F16D 3/34; F16D 15/00; F16D 41/04; F16H 3/44

[52] U.S. Cl. ............ 192/45; 192/45.1; 192/48.92; 475/281

[58] Field of Search ............ 475/269, 271, 475/280, 281, 282, 283, 284, 285; 192/45, 48.92, 45.1

[56] References Cited

U.S. PATENT DOCUMENTS

| | | | |
|---|---|---|---|
| 2,785,782 | 3/1957 | Dodge | 192/45.1 |
| 3,118,525 | 1/1964 | Fischer | 192/45 |
| 4,095,487 | 6/1978 | Cartwright et al. | 477/143 |
| 4,117,677 | 10/1978 | Murakami et al. | 192/45 X |
| 4,304,153 | 12/1981 | Moroto et al. | 475/281 X |
| 4,422,537 | 12/1983 | Ritter et al. | 192/45 |
| 4,782,931 | 11/1988 | Lederman | 192/48.92 X |
| 4,875,391 | 10/1989 | Leising et al. | 475/59 |
| 4,995,490 | 2/1991 | Kanai | 192/45 |
| 5,188,575 | 2/1993 | Leising et al. | 475/280 |

FOREIGN PATENT DOCUMENTS

| | | | |
|---|---|---|---|
| 2928587 | 1/1981 | Germany | 192/45 |
| 237122 | 10/1987 | Japan | 192/45 |
| 404175543 | 6/1992 | Japan | 475/269 |

Primary Examiner—Khoi Q. Ta
Attorney, Agent, or Firm—Thomas G. Pasternak

[57] ABSTRACT

An overrunning clutch assembly for an automatic transmission including a transmission housing, an input member, an output member, a plurality of gearsets for changing a ratio of torque between the input member and the output member, and at least one brake assembly to selectively couple predetermined gears of the gear assembly to the transmission housing, the overrunning clutch assembly including an inner race operatively connected to the brake assembly, an outer race operatively connected to the transmission housing, and a structure disposed between the inner race and outer race for allowing the brake assembly to rotate in only one direction.

19 Claims, 2 Drawing Sheets

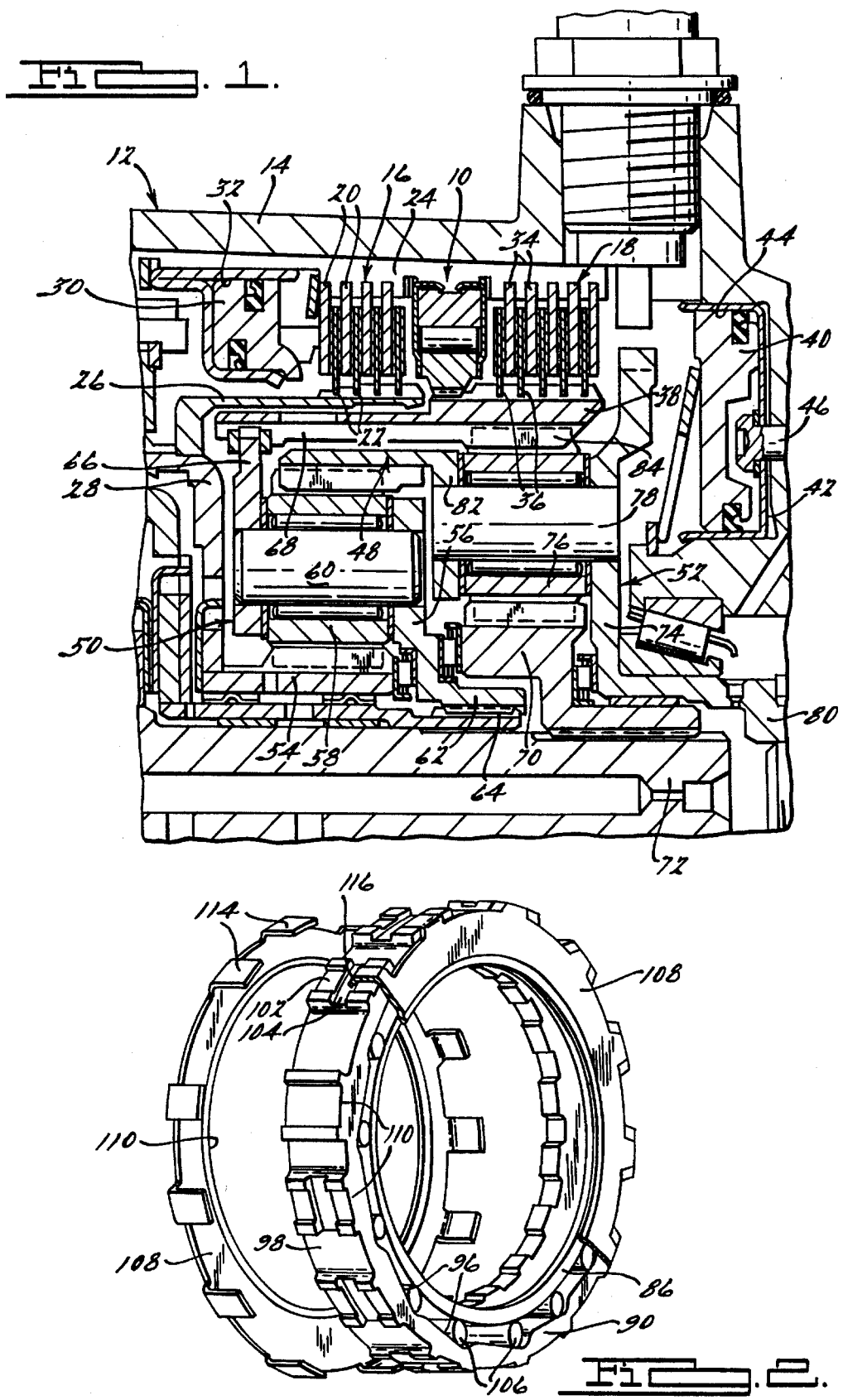

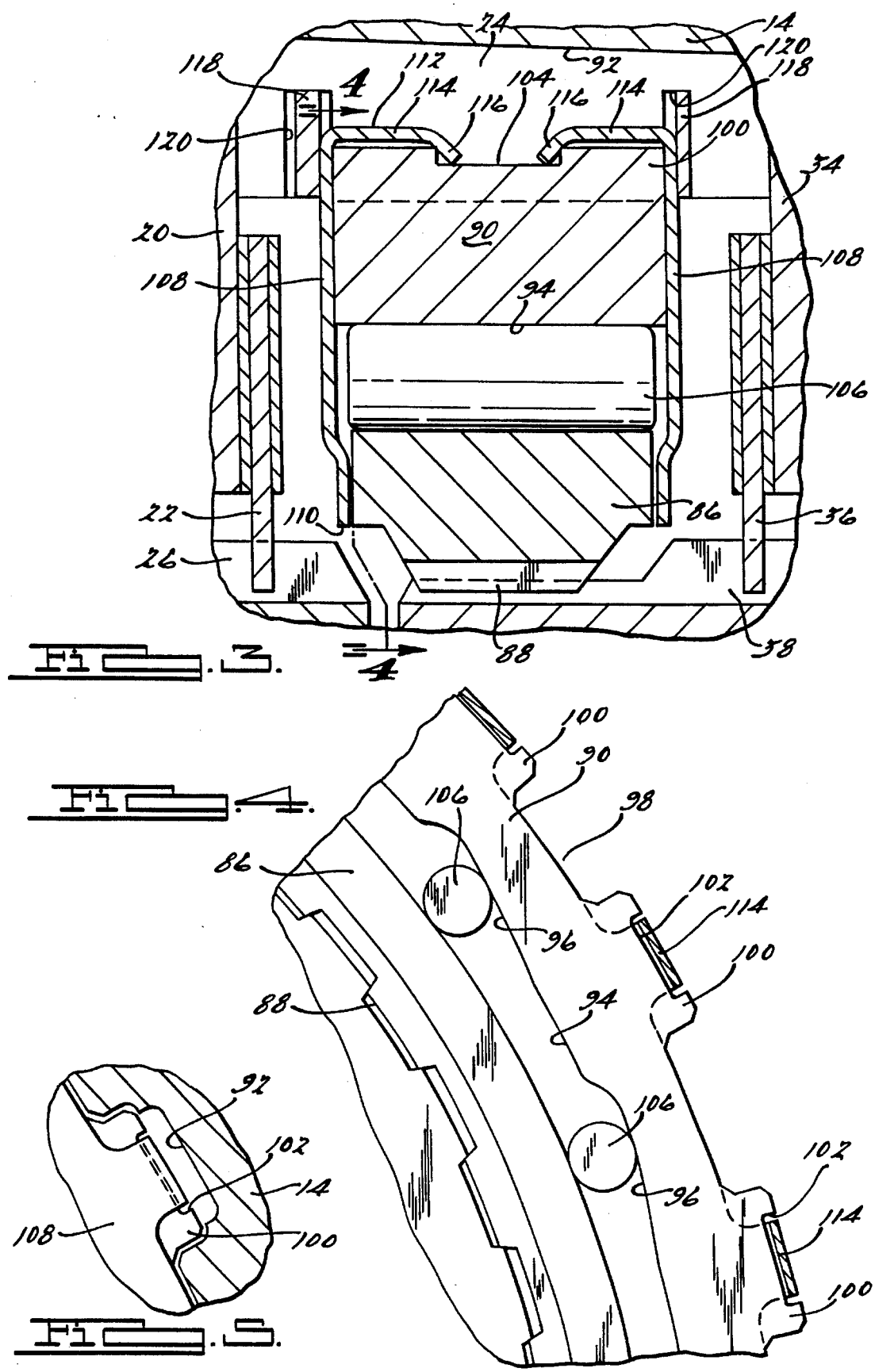

OVERRUNNING CLUTCH ASSEMBLY

BACKGROUND OF THE INVENTION

1. Field of the Invention

The present invention relates generally to automatic transmissions for vehicles and, more particularly, to an overrunning clutch assembly for an automatic transmission in an automotive vehicle.

2. Description of the Related Art

A conventional automatic transmission includes a hydrodynamic torque converter to transfer engine torque from an engine crankshaft to a rotatable input member of the transmission through fluid-flow forces. The automatic transmission also includes frictional units, typically referred to as clutches, which couple the rotatable input member to one or more members of a planetary gearset. Other frictional units, typically referred to as brakes, hold one or more members of the planetary gearset stationary during flow of power. An example of such an automatic transmission is disclosed in U.S. Pat. No. 4,875,391 to Leising et al.

Such transmissions also typically provide for one or more overrunning clutches in order to improve shift quality. Examples of overrunning clutches for automatic transmissions are ratchet type clutches and traction locking clutches such as a roller ramp or sprag clutch. A discussion of such clutches is disclosed in U.S. Pat. No. 5,070,978 to Pires. It may be desired to provide an overrunning clutch in the automatic transmission to improve shift quality but space within the transmission may be limited. As a result, there is a need in the art to provide an overrunning clutch for a plate and disc pack in an automatic transmission.

SUMMARY OF THE INVENTION

It is, therefore, one object of the present invention to provide an overrunning clutch assembly for an automatic transmission in an automotive vehicle.

It is another object of the present invention to provide an overrunning clutch assembly for a plate and disc pack for an automatic transmission.

It is yet another object of the present invention to provide an overrunning clutch assembly for a plate and disc pack which also functions as an axial reaction member for the plate and disc pack.

It is still another object of the present invention to provide unique overrunning clutch assembly for a plate and disc pack which, relative to today's automatic transmission, increases the compactness and decrease the axial length of the transmission. It is a further object of the present invention to provide a common reaction member between two plate and disc packs.

It is yet a further object of the present invention to provide a common spline between an overrunning clutch assembly and plate and disc pack.

To achieve the foregoing objects, the present invention is an overrunning clutch assembly for an automatic transmission including a transmission housing, an input member, an output member, a plurality of gearsets for changing a ratio of torque between the input member and the output member, and at least one brake assembly to selectively couple predetermined gears of the gearsets to the transmission housing. The overrunning clutch assembly includes an inner race operatively connected to the brake assembly, outer race operatively connected to the transmission housing, and means disposed between the inner race and outer race for allowing the brake assembly to rotate in only one direction.

One advantage of the present invention is that an overrunning clutch assembly is provided for an automatic transmission in an automotive vehicle. Another advantage of the present invention is that the overrunning clutch assembly is for a plate and disc pack in an automatic transmission. Yet another advantage of the present invention is that the overrunning clutch assembly functions to allow rotation of a plate and disc pack in only one direction and as an axial reaction member for the plate and disc pack. Still another advantage of the present invention is that the overrunning clutch fits within the space requirements of the automatic transmission. A further advantage of the present invention is that the overrunning clutch assembly provides a common reaction member between two plate and disc packs. Still a further advantage of the present invention is that the overrunning clutch assembly uses a common spline between an inner race and plate and disc pack.

Other objects, features and advantages of the present invention will be readily appreciated as the same becomes better understood after reading the subsequent description taken in conjunction with the accompanying drawings.

BRIEF DESCRIPTION OF THE DRAWINGS

FIG. 1 is a cross-sectional view of an overrunning clutch assembly, according to the present invention, illustrated in operational relationship to an automatic transmission.

FIG. 2 is a partial exploded perspective view of the overrunning clutch assembly of FIG. 1.

FIG. 3 is an enlarged view of the overrunning clutch assembly of FIG. 1.

FIG. 4 is a sectional view taken along line 4—4 of FIG. 3.

FIG. 5 is a partial fragmentary view of a portion of the overrunning clutch assembly of FIG. 3.

DESCRIPTION OF THE PREFERRED EMBODIMENT(S)

Referring to FIG. 1, an overrunning clutch assembly 10, according to the present invention, is illustrated in operational relationship to an automatic transmission, generally indicated at 12 and partially shown. The automatic transmission 12 is adapted for use in a vehicle (not shown) such as an automotive vehicle. The automatic transmission is similar to the four-speed automatic transmission 12 disclosed in U.S. Pat. No. 4,875,391, the disclosure of which is hereby incorporated by reference, except to that specifically illustrated and described herein.

The automatic transmission 12 includes a transmission housing 14 for enclosing a two/four shift brake assembly, generally indicated at 16 (applied in second and fourth gears), and a low-reverse brake assembly, generally indicated at 18 (applied in first and reverse gears) at the output end thereof. The two/four shift brake assembly 16 includes a plurality of axially spaced annular plates 20 and a plurality of axially spaced annular discs 22. The discs 22 are alternated between the plates 20 and when the brake assembly 16 is not applied, these plates and discs are free to move or rotate relative to each other. The plates 20 are mounted in splines of circumferentially spaced and radially inwardly extending fingers 24 inside the transmission housing 14. The discs 22 are mounted in splines formed in an axially extending flange 26 of a reverse clutch hub 28. To apply the two/four shift brake assembly 16, the automatic transmission 12 includes a hydraulic piston 30 which operates in a cavity formed by an annular piston housing 32. The piston housing 32 is secured to the transmission housing 14 by suitable tab fastening means (not shown). It should be appreciated that the plates 20 and discs 22 form a plate and disc pack.

The low/reverse brake assembly 18 includes a plurality of axially spaced annular plates 34 and a plurality of axially spaced annular discs 36. The plates 34 and discs 36 are similar to those of the two/four shift brake assembly 16. The plates 34 are mounted in splines of the fingers 24 inside the transmission housing 14. The discs 36 are mounted in splines of an outer portion 38 of an annulus gear 84 of a gear assembly 48 to be described further herein. To apply the low/reverse brake assembly 18, the automatic transmission 12 includes a hydraulic piston 40 which operates in a cavity formed by an annular piston housing 42. The piston housing 42 is disposed in an annular recess 44 of the transmission housing 14 and secured by suitable fastening means, such as bolts 46, to the transmission housing 14.

The automatic transmission 12 also includes a gear assembly 48 for changing the ratio of torque between an input member, such as input shaft (not shown), and an output member, such as output gear (not shown). The gear assembly 48 includes a front or first planetary gearset, generally indicated at 50, and an axially spaced rear or second planetary gearset, generally indicated at 52. The first planetary gearset 50 includes a first sun gear 54 at its center. The first sun gear 54 is connected to the reverse clutch hub 28 at its inner periphery. The first planetary gearset 50 also includes a first planetary carrier 56 disposed about the first sun gear 54 and having a plurality of circumferentially spaced first pinion gears 58 mounted about shafts 60 connected to the first planet carrier 56. The first planet carrier 56 includes an inner portion 62 splined to an overdrive clutch hub 64 (partially shown). The first planetary carrier 56 also includes a radially extending outer portion 66 connected to the outer portion 38 of the second planetary gearset 52. The first planetary gearset 50 further includes a first annulus gear 68 disposed about the first planetary carrier 56 and engaging the first pinion gears 58.

The rear or second planetary gearset 52 includes a second sun gear 70 at its center which is splined at to a gear shaft 72. The second planetary gearset 52 also includes a second planetary carrier 74 disposed about the second sun gear 70. The second planetary carrier 74 includes a plurality of circumferentially spaced second pinion gears 76 mounted about shafts 78 connected to the second planetary carrier 74. The second planetary carrier 74 includes an inner portion 80 splined at a rotatable output gear (not shown) which acts as the output member of the automatic transmission 12. The second planetary carrier 74 also includes an outer portion 82 connected to the first annulus gear 68. The second planetary gearset 52 further includes a second annulus gear 84 disposed about the second planet carrier 74 and engages the second pinion gears 76. It should be appreciated that the outer portion 38 of the second annulus gear 84 is connected to the first planet carrier 56.

Referring to FIGS. 1 through 5, the overrunning clutch assembly 10 is disposed between the two/four shift brake assembly 16 and the low/reverse brake assembly 18. The overrunning clutch assembly 10 includes an inner race 86 which is annular and extends axially. The inner race 86 is splined at 88 to the outer portion 38 of the second annulus gear 84. The splined portion of the inner race 86 has a width less than a width of the remainder of the inner race 86. The overrunning clutch assembly 10 also includes an outer race 90 disposed about and spaced radially from the inner race 86. The outer race 90 is annular and extends axially. The outer race 90 has at least one projection 100 to be described disposed in a recess 92 of the housing 14. The outer race 90 has an inner periphery or surface 94 with a plurality of circumferentially spaced ramps 96. The ramps 96 extend circumferentially and radially outwardly from the inner surface 94 to an outer periphery or surface 98 of the outer race 90 for a function to be described. The outer race 90 also has a plurality of projections 100 extending radially outwardly from the outer surface 98 and spaced circumferentially thereabout. The projections 100 have an asymmetric spacing to prevent misassembly of the outer race 90 relative to the inner race 86. The projections 100 are generally rectangular in shape and have a first recess 102 extending axially therethrough and a second recess 104 extending circumferentially therethrough for a function to be described. The first recess 102 is generally rectangular in shape and has a width greater than a width of the second recess 104. The second recess 104 is generally rectangular in shape and has a depth greater than a depth of the first recess 102.

The overrunning clutch assembly 10 includes a plurality of rollers 106 disposed between the inner race 86 and outer race 90. The rollers 106 are generally cylindrical in shape and extend axially. Preferably, one roller 106 is disposed along each ramp 96 of the outer race 90.

The overrunning clutch assembly 10 also includes a retainer 108 disposed along each axial side of the inner race 86 and outer race 90. The retainer 108 is generally circular in shape, and extends radially. The retainer 108 has an inner periphery 110 formed by an aperture extending axially therethrough to allow the retainer 108 to be disposed about the gear assembly 48. The retainer 108 also has an outer periphery 112 formed by a plurality of tangs 114 which extend axially and are spaced circumferentially about the outer periphery 112. The tangs 114 are generally rectangular in shape and have a width less than a width of the first recess 102 to be received therein. The tangs 114 partially overlap the second recess 104 and are folded over and rolled radially inwardly to form a flange 116 to be disposed in the second recess 104. The overrunning clutch assembly 10 further includes a snap ring 118 disposed adjacent each retainer 108 and in a groove 120 extending radially into the fingers 24 adjacent each axial side of the recess 92.

At the output end of the transmission, the two/four shift and low/reverse brake assemblies 16 and 18, respectively, are used to hold particular gears of the gear assembly 48 against rotation by coupling it to the relatively stationary transmission housing 14. To apply the two/four shift brake assembly 16, hydraulic pressure from fluid entering between the piston housing 32 and the hydraulic piston 30 moves the hydraulic piston 30 axially. The hydraulic piston 30 forces the plates 20 and discs 22 of the two/four shift brake assembly 16 together against the overrunning clutch assembly 10 and produces a frictional force between them. Because the plates 20 do not rotate or are stationary, as they are connected to the transmission housing 14, the frictional force holds the discs 22 stationary, in turn, holding the flange 26, reverse clutch hub 28 and first sun gear 54 stationary. It should be appreciated that when the hydraulic fluid to the two/four shift brake assembly 16 or hydraulic piston 30 is vented, the hydraulic piston 30 is returned to its non-applied position as illustrated in FIG. 1.

To apply the low/reverse brake assembly 18, hydraulic pressure from fluid entering between the piston housing 42 and the hydraulic piston 40 moves the hydraulic piston 40 axially. The hydraulic piston 40 forces the plates 34 and discs 36 of the low/reverse brake assembly 18 together against the overrunning clutch arrangement 10 and produces a frictional force between them. Because the plates 34 are stationary, as they are connected to the transmission housing 14, the frictional force holds the discs 36 stationary, in turn, holding the second annulus gear 84 and first planet carrier 56 stationary. It should be appreciated that when the hydraulic fluid to the low/reverse brake assembly 18 or hydraulic piston 40 is vented, the hydraulic piston 40 is returned to its non-applied position as shown in FIG. 1.

In the overrunning clutch assembly 10, the inner race 86 rotates clockwise with the outer portion 38 of the second annulus gear 84 because the rollers 106 are disposed at one end of the ramps 96. The overrunning clutch assembly 10 restricts the discs 36 of the low/reverse brake assembly 18 from rotating counter-clockwise because of the engagement of the rollers 106 with the inner race 86 and outer race 90 at the other end of the ramp 96.

Accordingly, the overrunning clutch assembly 10 allows rotation of the low/reverse brake assembly 18 in only one direction. Also, the overrunning clutch assembly 10 is used as a reaction member for both the two/four shift brake assembly 16 and low/reverse brake assembly 18.

The present invention has been described in an illustrative manner. It is to be understood that the terminology which has been used is intended to be in the nature of words of description rather than of limitation.

Many modifications and variations of the present invention are possible in light of the above teachings. Therefore, within the scope of the appended claims, the present invention may be practiced other than as specifically described.

What is claimed is:

1. An overrunning clutch assembly for an automatic transmission including a transmission housing, an input member, an output member, a plurality of gearsets for changing a ratio of torque between the input member and the output member, and at least one brake assembly to selectively couple predetermined gears of the gearsets to the transmission housing, said overrunning clutch assembly comprising:

an inner race operatively connected to said at least one brake assembly;

an outer race operatively connected to the transmission housing;

means disposed between said inner race and outer race for allowing said at least one brake assembly to rotate in only one direction; and a retainer disposed adjacent said inner race and said outer race and extending radially over said inner race and said outer race for retaining said inner race and said outer race and said means together as a single unit.

2. An overrunning clutch assembly for an automatic transmission including a transmission housing, an input member, an output member, a plurality of gearsets for changing a ratio of torque between the input member and the output member, and at least one brake assembly to selectively couple predetermined gears of the gearsets to the transmission housing, said overrunning clutch assembly comprising:

an inner race operatively connected to said at least one brake assembly;

an outer race operatively connected to the transmission housing;

means disposed between said inner race and outer race for allowing said at least one brake assembly to rotate in only one direction;

a retainer disposed adjacent said inner race and said outer race and extending radially over said inner race and said outer race, for retaining said inner race and said outer race and said means together as a single unit;

said outer race having an inner periphery and an outer periphery; and wherein said inner periphery has a plurality of ramps spaced circumferentially thereabout.

3. An overrunning clutch assembly as set forth in claim 2 wherein said ramps extend circumferentially and radially from said inner periphery toward said outer periphery.

4. An overrunning clutch assembly for an automatic transmission including a transmission housing, an input member, an output member, a plurality of gearsets for changing a ratio of torque between the input member and the output member, and at least one brake assembly to selectively couple predetermined gears of the gearsets to the transmission housing, said overrunning clutch assembly comprising:

an inner race operatively connected to said at least one brake assembly;

an outer race operatively connected to the transmission housing;

means disposed between said inner race and outer race for allowing said at least one brake assembly to rotate in only one direction;

said outer race having an inner periphery and an outer periphery; and said outer periphery having a plurality of projections spaced circumferentially thereabout and extending radially outwardly therefrom and each of said projections having a recess extending axially therethrough.

5. An overrunning clutch assembly for an automatic transmission including a transmission housing, an input member, an output member, a plurality of gearsets for changing a ratio of torque between the input member and the output member, and at least one brake assembly to selectively couple predetermined gears of the gearsets to the transmission housing, said overrunning clutch assembly comprising:

an inner race operatively connected to said at least one brake assembly;

an outer race operatively connected to the transmission housing;

means disposed between said inner race and outer race for allowing said at least one brake assembly to rotate in only one direction;

said outer race having an inner periphery and an outer periphery;

said outer periphery having a plurality of projections spaced circumferentially thereabout and extending radially outwardly therefrom; and wherein each of said projections has a first recess extending axially therethrough and a second recess extending circumferentially therethrough.

6. An overrunning clutch assembly as set forth in claim 5 including a retainer member disposed adjacent each side of said inner race and said outer race and having a plurality of tangs spaced circumferentially thereabout, said tang being disposed in said first recess.

7. An overrunning clutch assembly as set forth in claim 6 wherein each of said tangs has a flange disposed in said second recess.

8. An automatic transmission comprising:

a transmission housing;

an input member;

an output member;

a plurality of gearsets for changing a ratio of torque between said input member and said output member;

a plurality of brake assemblies to selectively couple predetermined gears of said gearsets to said transmission housing; and an overrunning clutch assembly disposed axially between an adjacent pair of said brake assemblies to act as an axial brake reaction member for the pair of said brake assemblies.

9. An automatic transmission as set forth in claim 8 wherein said gearsets comprises a first planetary gearset and a second planetary gearset axially spaced from said first planetary gearset.

10. An automatic transmission as set forth in claim 9 wherein each of said first and second planetary gearsets comprises a sun gear, annulus gear and a planetary carrier having at least one pinion gear disposed between said sun gear and said annulus gear.

11. An automatic transmission comprising:

a transmission housing;

an input member;

an output member;

a plurality of gearsets for changing a ratio of torque between said input member and said output member;

a plurality of brake assemblies to selectively couple predetermined gears of said gearsets to said transmission housing;

an overrunning clutch assembly disposed between an adjacent pair of said brake assemblies to act as an axial reaction member for the pair of said brake assemblies;

said gearsets comprising a first planetary gearset and a second planetary gearset axially spaced from said first planetary gearset;

each of said first and second planetary gearsets comprising a sun gear, annulus gear and a planetary carrier having at least one pinion gear disposed between said sun gear and said annulus gear; and said brake assemblies comprising a plurality of axially spaced plates and discs to couple the transmission housing to either one of said sun gear of said first planetary gearset and said annulus gear of said second planetary gearset.

12. An automatic transmission as set forth in claim 8 wherein said overrunning clutch assembly comprises an inner race operatively connected to one of said brake assemblies, an outer race operatively connected to said transmission housing and a plurality of rollers disposed between said inner race and said outer race.

13. An automatic transmission as set forth in claim 12 including a retainer disposed adjacent each side of said inner race and said outer race.

14. An automatic transmission as set forth in claim 13 wherein said outer race is disposed about said inner race and has an inner periphery and an outer periphery.

15. An automatic transmission as set forth in claim 14 wherein said inner periphery has a plurality of ramps spaced circumferentially thereabout.

16. An automatic transmission comprising:

a transmission housing;

an input member;

an output member;

a plurality of gearsets for changing a ratio of torque between said input member and said output member;

a plurality of brake assemblies to selectively couple predetermined gears of said gearsets to said transmission housing;

an overrunning clutch assembly disposed between an adjacent pair of said brake assemblies to act as an axial reaction member for the pair of said brake assemblies;

said overrunning clutch assembly comprising an inner race operatively connected to one of said brake assemblies, an outer race operatively connected to said transmission housing and a plurality of rollers disposed between said inner race and said outer race;

a retainer disposed adjacent each side of said inner race and said outer race;

said outer race being disposed about said inner race and having an inner periphery and an outer periphery;

said inner periphery having a plurality of ramps spaced circumferentially thereabout; and said outer periphery having a plurality of projections spaced circumferentially thereabout.

17. An automatic transmission as set forth in claim 16 wherein each of said projections has a first recess extending axially therethrough and a second recess extending circumferentially therethrough.

18. An automatic transmission as set forth in claim 16 wherein said projections are spaced asymmetrically about said outer periphery.

19. An automatic transmission as set forth in claim 17 wherein said inner race is spline connected to one of said brake assemblies.

* * * * *